Sept. 24, 1957 C. H. BECKER 2,807,674

STEREOPHONIC SOUND SYSTEM AND METHOD

Filed June 29, 1953 4 Sheets-Sheet 1

INVENTOR.
Carl H. Becker

BY Flehr & Swain

ATTORNEYS

INVENTOR.
Carl H. Becker
BY
Flehr & Swain
ATTORNEYS

INVENTOR.
Carl H. Becker
BY Flehr & Swain
ATTORNEYS

INVENTOR.
Carl H. Becker
BY
ATTORNEYS

United States Patent Office 2,807,674

Patented Sept. 24, 1957

2,807,674

STEREOPHONIC SOUND SYSTEM AND METHOD

Carl H. Becker, Los Altos, Calif., assignor to Ampex Electric Corporation, Redwood City, Calif., a corporation of California Application June 29, 1953, Serial No. 364,561

4 Claims. (Cl. 179—100.1)

This invention relates generally to stereophonic systems and methods such as are suitable for the recordation and reproduction of sound.

It is well known that realism can be imparted to reproduce sound by the use of stereophonic recording. Particularly the directivity effects imparted by use of stereophonic recording lends realism when properly coordinated with moving picture images. A stereophonic recording can be obtained by using pick-up microphones distributed horizontally adjacent the region from which acoustic events are originating. The pick-up from the microphones are amplified and recorded in separate channels on a common recording medium, such as magnetic tape. For reproduction separate magnetic heads operate on the different channels of the record, and are connected to the inputs of separate power amplifiers, which in turn have their outputs connected to separate loud speakers. The loud speakers can be positioned in a manner corresponding generally to the positioning of the original microphones. A system of this character is capable of producing stereophonic effects in marked contrast to single channel recording. However, such a simple system and method is not suitable for many commercial purposes, particularly for the stereophonic recording and reproduction of all the sounds and sound effects which are desired in connection with moving pictures.

In my copending application, Serial No. 364,562, filed June 29, 1953, there is disclosed a stereophonic system and method making use of a considerable number of microphones and channels. For example, six microphones can be used in conjunction with six recording channels, and the microphones are located substantially equal distances from a viewing center and in a zone which can be referred to as a microphone curtain. Assuming that lines are projected from the microphones to the viewing center, distribution preferably is such that the azimuth angles between the projection lines are equal, at least for the microphones which are within the viewing range of the camera lens. The number of microphones employed, and their directional characteristics, are such that as a source of sound moves from the field of one microphone to the next, the transition is gradual and without an acoustical hole or shadow. The system and method disclosed in said copending application imparts good directivity to the recorded sound, and assuming that two or more microphone curtains are distributed in different regions of the staging area from which the acoustical events originate, desirable depth effects can be obtained.

In general it is an object of the present invention to provide a novel system and method of the above character in which directivity effects are subject to control whereby the entire sound image can be shifted in azimuth.

Another object of the invention is to provide a system and method of the above character which enables a monitor to effectively shift a plurality of sound channels in azimuth, to thereby modify the apparent directivity of the sound image.

Another object of the invention is to provide a stereophonic system and method which is adapted for a microphone distribution over either 180° or 360°.

Referring to the drawing.

Figure 1:
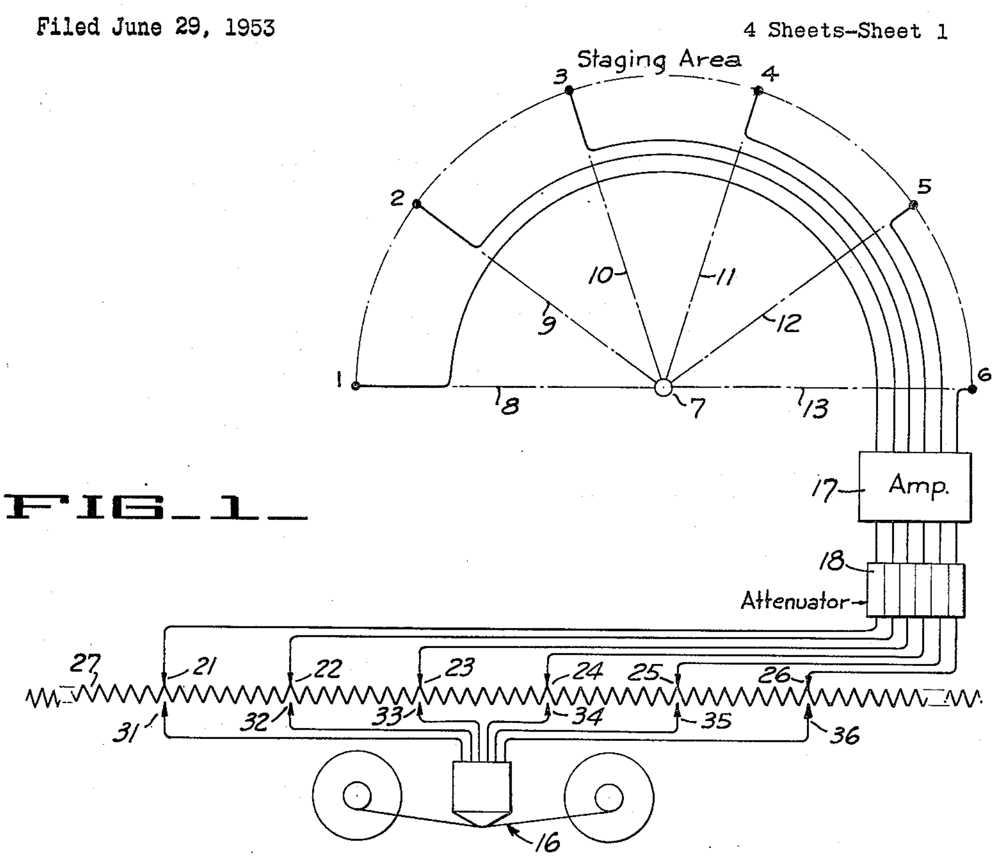
Figure 1 is a schematic plan view illustrating a system in accordance with the present invention.

The invention as illustrated in Figure 1 makes use of a plurality of microphones numbered 1 to 6 inclusive, which are located in such a manner as to pick up sound from a staging area stereophonically. One arrangement of microphones which can be used to advantage is to group them about the viewing center 7. Thus each microphone is shown located a fixed radial distance from the viewing center, along the projection lines 8 to 13 inclusive. As illustrated the distribution is over an angle of 180°. Distribution can be over angles less or greater than 180°, as required. Assuming that the system is to be used in conjunction with the taking of motion picture films, the camera can be located adjacent to viewing center 7, and can be directed over the staging area in the front of the microphones. Preferably the microphones employed have unidirectional characteristics, with their directivity axes coincident with vertical planes coinciding with the projection lines 8 to 13 inclusive. Likewise it is preferable for the effective pick-up fields of the separate microphones to be overlapping, whereby when an acoustical event travels across the staging area in front of the microphones, there is a gradual transition from one microphone to another, without serious acoustic holes.

The microphones are connected to the several recording channels of the recording device 16, through amplifying and a special monitoring means. Thus, a multichannel amplifying means 17 has its several inputs connected to the microphones, and its outputs connected to the attenuating means 18. The several outputs from the attenuating means connect to the taps 21 to 26 inclusive, on the extended resistor 27. Additional taps 31 to 36 inclusive make connection with the resistor 27, and in turn are connected to the several magnetic heads of the magnetic tape recorder 16.

The attenuating means 18 is preferably constructed in such a manner that individual attenuator elements can be separately adjusted for dynamic adjustment of the amplified pick-up from each of the microphones. At the same time it is preferable to provide a gang control whereby all of the separate attenuators can be adjusted simultaneously.

The taps 21 to 26 are equally spaced and this is likewise true of the taps 31 to 36 inclusive. One set of these taps as for example the taps 31 to 36, are mechanically connected for unison (i. e. gang) control, whereby these taps can be moved in one direction or the other along the resistor 27.

Assuming that the taps are in alignment as illustrated in Figure 1, the portions of the resistor which are connected between the taps have an ohmic value relatively high compared to the resistances of the several attenuators, whereby cross-talk is reduced to a minimum. Assuming that sounds are being picked up by the microphones stereophonically, the pick-up of each microphone is recorded upon a separate channel of the magnetic recorder 16. The relative intensity of the various channels can be adjusted by the monitor. Assuming now that it is desired to artificially change the directivity, the operator shifts the taps 31 to 36 inclusive to the left or the right, as desired. As these taps are shifted to the left, a gradual transition between taps occurs whereby taps 21 to 26 inclusive are ultimately aligned with taps 32 to 36 inclusive. This, in effect, rotates the directivity in azimuth, or in other words it modifies the apparent direction from which sound is received by an angular amount corresponding to the angularity (in azimuth) between the successive microphones. Further movement of the taps 31 to 36 to the left has the effect of further rotating the directivity in azimuth while at the same time, commencing with the channel connected to tap 31, the signal intensity is gradually reduced to substantially zero.

In referring to a rotation in azimuth it should be understood that the rotation is effective when the multi-channel magnetic record is played back through loud speakers positioned in a manner comparable to the microphones 1 to 6 inclusive. In other words assuming the use of a playback through separate amplifier channels and six loud speakers, positioned in an auditorium about the viewing center through 180°, then the ultimate effect of monitoring by shifting the taps 31 to 36 inclusive, is to shift the reproduced directivity from that which actually existed on the staging area.

Figure 2:
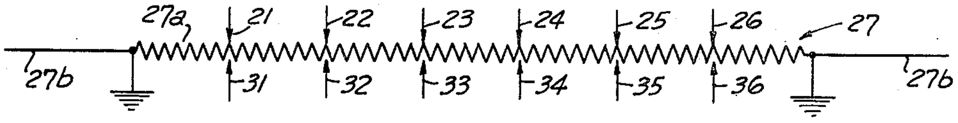
Figure 2 is a detail schematically illustrating a modification of a part of the system shown in Figure 1.

As shown in Figure 2, in place of the simple resistor 27 I have shown a resistor 27*a*, having its terminals connected to the extended conductors 27*b*. When the taps 31 to 36 are moved toward the left or toward the right, the advancing taps are ultimately grounded thereby positively reducing excitation of the same to zero.

Figure 3:
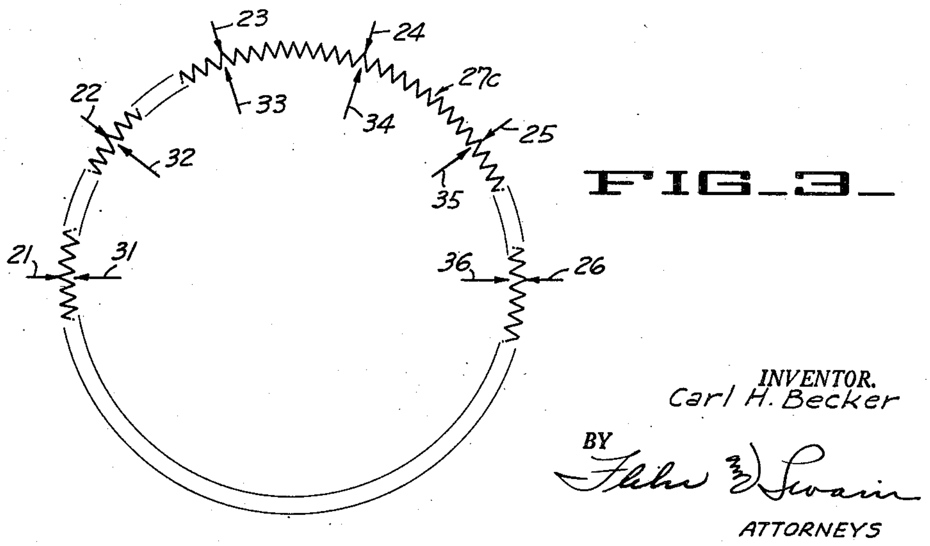
Figure 3 is a detail illustrating another modification of Figure 1.

As shown in Figure 3 the resistor 27*c*, corresponding to the resistor 27 of Figure 1, is made continuous, or in other words in the form of a ring. With this arrangement the taps 31 to 36 can be rotated through 360°.

Figures 4, 5:
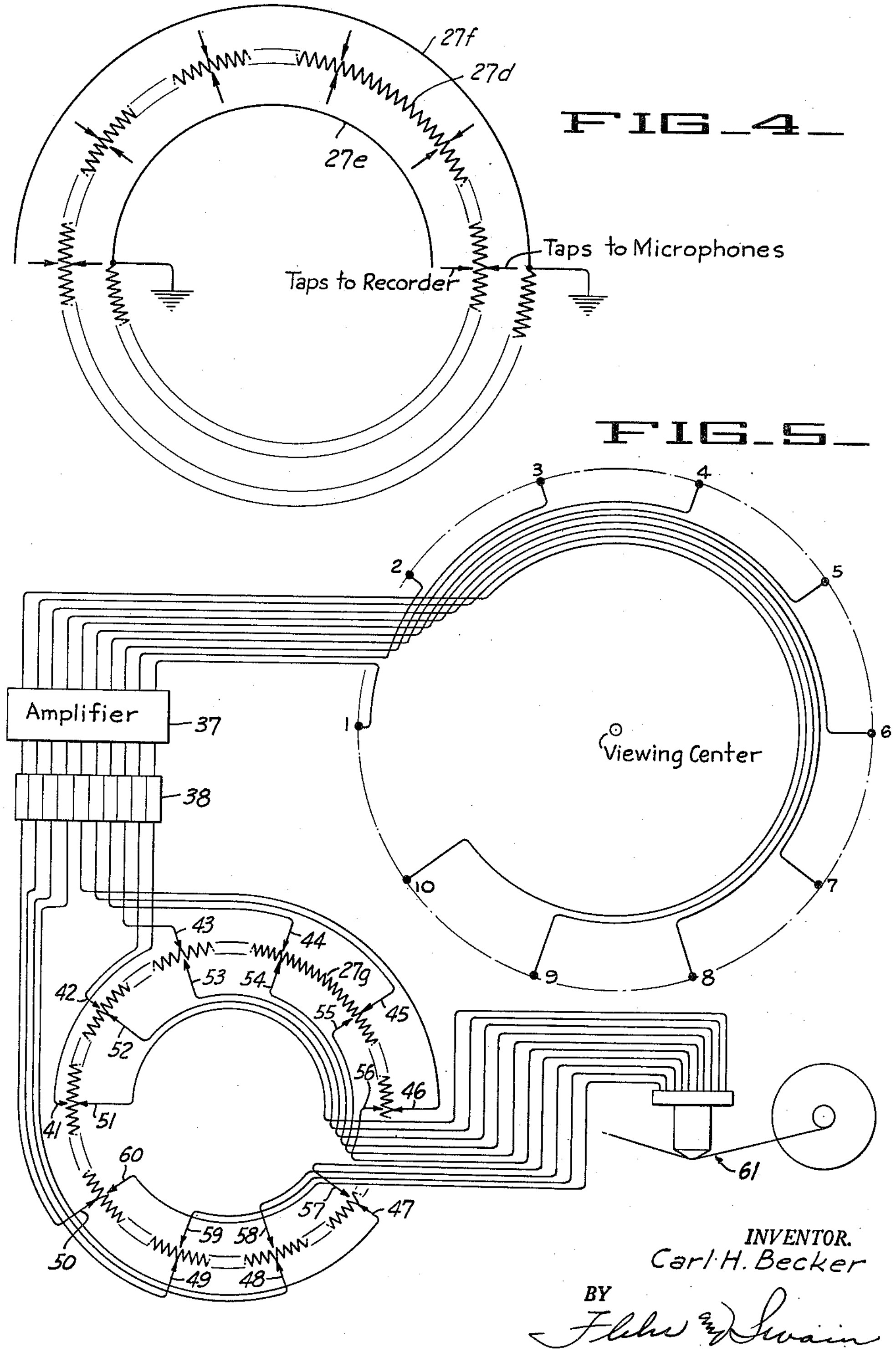
Figure 4 is a detail illustrating a further modification of Figure 1.
Figure 5 is a schematic plan view illustrating a 360° distribution of microphones together with directivity monitoring means associated with the same.

In the modified arrangement illustrated in Figure 4, the resistor 27*d* is in the form of a spiral, with its terminals connected to the extended grounded conductors 27*e* and 27*f*. With such an arrangement when the adjustment is toward the limiting positions, the advancing contacts are successively grounded upon the conductors 27*e* and 27*f*.

In some instances it is desirable to distribute the microphones over 360°, as illustrated in Figure 5. In this instance, the microphones are numbered 1 to 10 inclusive, and are located substantially equal distances apart, and equal distances from the viewing center. The outputs of the various microphones are separately connected to the input channels of the multi-channel amplifying means 37, which has its several outputs connected to the individual and gang controlled attenuators 38. The outputs of the attenuators are connected to the several taps 41 to 50 inclusive, which are distributed about the resistor 27*g*. Taps 51 to 60 inclusive also connect with resistor 27*g*, and to the several magnetic heads of the magnetic tape recorder 61.

The system of Figure 5 permits rotation in azimuth through 360°. Rotation can be obtained by simultaneously turning all of the contacts 51 to 60 inclusive, or if desired the contacts 41 to 50 inclusive can be moved while maintaining the other contacts stationary.

Figures 6, 7:
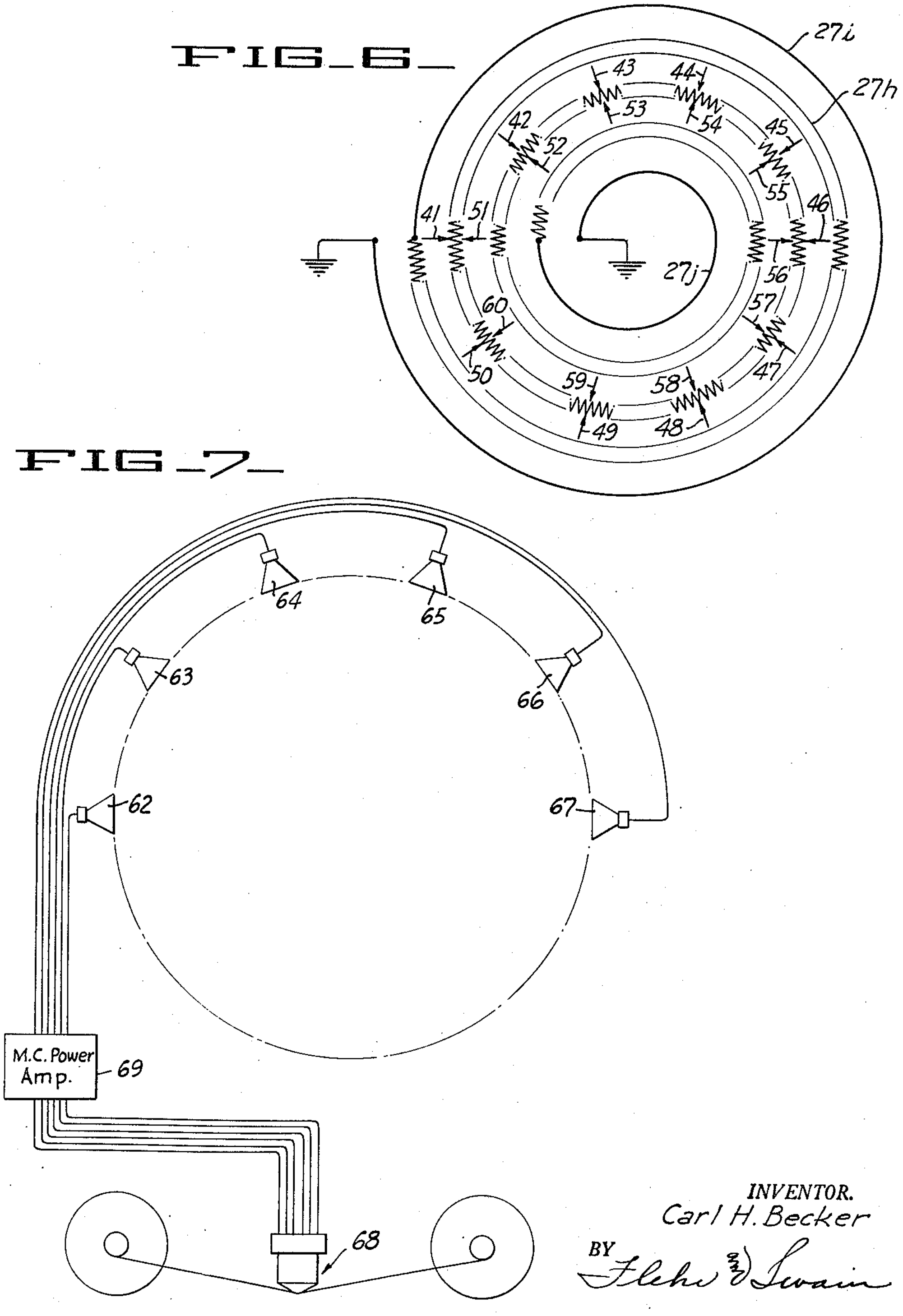
Figure 6 is a detail illustrating a modification of the system shown in Figure 5.
Figure 7 is a schematic plan view illustrating a reproducing system for the reproduction of records made in accordance with the system of Figure 1.

In place of the simple ring-type resistor shown in Figure 5, it is possible to use the spiral arrangement of Figure 6. In this instance the resistor 27*h* is extended as a spiral, and its terminals are connected to the extended spiral conductors 27*i* and 27*j*. The contacts can be moved along this spiral resistor in the same manner as described with reference to Figures 2 and 4.

Figure 7 illustrates a reproduction system which can be used with the recording system of Figure 1. The loud speakers 62 to 67 inclusive are distributed 180° about the seating area of the auditorium. The angularity with respect to the viewing center is substantially the same as the original positioning of the microphones. The magnetic tape, produced from the system of Figure 1, is reproduced on a suitable multichannel magnetic tape reproducing apparatus 68, and the several reproduced channels, after being amplified by the multichannel power amplifier 69, are applied to the separate loud speakers 62 to 67 inclusive.

In many instances it is desirable to film a motion picture in conjunction with recording the stereophonic events. In general the motion picture camera may, for example, be located adjacent the viewing center of Figure 1, and is operated in synchronism with the recorder. For projection, a suitable projector is operated in synchronism with the magnetic reproducer, and is arranged to display the projected image upon a screen located symmetrically with respect to the loud speakers.

Figure 8:
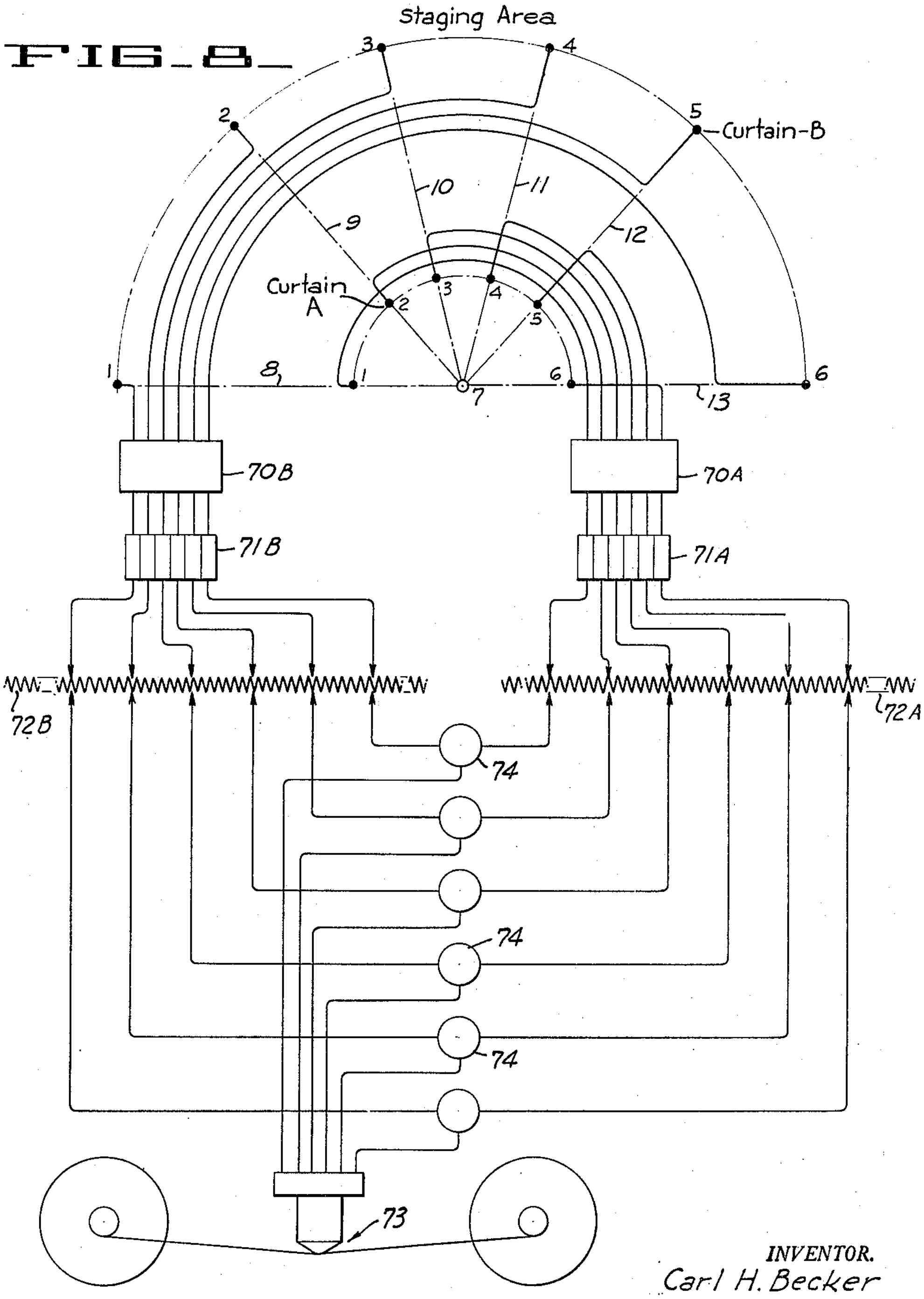
Figure 8 is a plan view schematically illustrating a system incorporating my invention in which two microphone curtains are employed.

As illustrated in Figure 8, I may employ a plurality of microphone curtains distributed to pick up acoustic events on the staging area. Thus the microphones 1 to 6 inclusive can be distributed to form curtain A, and additional microphones 1 to 6 inclusive distributed in a separate curtain B. The corresponding microphones of these curtains are preferably aligned along the projection lines 8 to 13 inclusive. Assuming that motion pictures are being filmed in conjunction with the stereophonic recording the microphones of curtain A can be carried by the mounting of the camera, in the manner disclosed and claimed in said copending application, Serial No. 364,562, filed June 29, 1953, and the microphones of curtain B can be located well in the background of the staging area, and used for securing depth effects, for recording reverberations, background orchestration, or the like. The microphones of the two curtains are shown connected to the inputs of the multi-channel amplifiers 70A and 70B which in turn have their outputs connected through attentuators 71A and 71B to the azimuth control devices 72A, 72B. These devices can be substantially the same as previously described, as for example as illustrated in connection with Figure 1. Corresponding taps upon the azimuth control devices 72A, 72B, are connected to corresponding channels on the magnetic tape recorder 73, through suitable mixing devices 74. The mixing devices can be individually and simultaneously adjusted, and can be arranged whereby the range of adjustment permits a gradual transmission of pick-up from one microphone to the other. Thus by gang control of the mixing devices 74, the pickup from one curtain can be made to predominate over the other. During most recording operations it will be found convenient to have curtain A predominate over curtain B, and curtain B can be used to give special depth effects, and to record background music or noises, reverberations and the like. It will be evident that by making adjustment of either one or both of the monitoring azimuth controls 72A and 72B, the directivity can be rotated with respect to either or both curtains.

It will be evident that the system and method described above makes possible a wide range of stereophonic effects, together with highly desirable monitoring at the time a stereophonic record is being made. Particularly monitoring with respect to directivity can be utilized to accent or secure special directivity effects, which will enhance and lend greater realism to the reproduced sound. As previously mentioned, the stereophonic system can be utilized in conjunction with the filming and reproduction of motion pictures, or it can be used independently for the stereophonic recording and reproduction of sound.

I claim:

1. In a system of the character described, means for forming electrical currents representing sounds picked up stereophonically from a staging area, multi-channel recording means, and a monitoring means serving to apply currents from said first named means to said recording means, said monitoring means comprising means for shifting the application of the currents to the several channels to change the apparent directivity of the sounds.

2. A system as in claim 1 in which said monitoring means comprises a resistor having points along its length connected to receive said currents, and also having points along its length connected to the channels of said recording means, one of said set of points being shiftable along the resistor relative to the other points of connection.

3. A system as in claim 2 in which the resistor is in the form of a ring.

4. A system as in claim 2 in which the resistor includes grounded conductors connecting to its terminals, and with which said movable points of connection may make contact.

References Cited in the file of this patent

UNITED STATES PATENTS

| | | |
|---|---|---|
| 2,114,019 | Friebus | Apr. 12, 1938 |
| 2,298,618 | Garity | Oct. 13, 1942 |
| 2,343,471 | Nixon | Mar. 7, 1944 |
| 2,668,880 | Friess | Feb. 9, 1954 |